United States Patent [19]

Wolfla et al.

[11] 4,124,737

[45] Nov. 7, 1978

[54] HIGH TEMPERATURE WEAR RESISTANT COATING COMPOSITION

[75] Inventors: Thomas A. Wolfla, Indianapolis; Robert C. Tucker, Jr., Brownsburg, both of Ind.

[73] Assignee: Union Carbide Corporation, New York, N.Y.

[21] Appl. No.: 755,723

[22] Filed: Dec. 30, 1976

[51] Int. Cl.² ............... B32B 15/00; C22C 19/05
[52] U.S. Cl. .................. 428/640; 428/668; 428/679; 428/926; 428/937; 75/0.5 BB; 75/0.5 BC; 75/134 F; 75/171; 75/235
[58] Field of Search ............... 75/171, 134 F, 0.5 R, 75/0.5 BC, 232, 235; 427/423; 428/864, 926, 640, 937, 651, 668, 652, 653, 678, 679

[56] References Cited

U.S. PATENT DOCUMENTS

| | | | |
|---|---|---|---|
| 3,366,478 | 1/1968 | Wheaton | 75/171 |
| 3,864,093 | 2/1975 | Wolfla | 428/564 |
| 4,003,765 | 1/1977 | Davidson | 75/171 |
| 4,012,229 | 3/1977 | Herchenroeder | 75/171 |

*Primary Examiner*—Arthur J. Steiner
*Attorney, Agent, or Firm*—Dominic J. Terminello

[57] ABSTRACT

A coating composition for producing high temperature, wear-resistant coatings on a metallic substrate, such as a nickel, cobalt, or iron base alloy, consisting of a cobalt base alloy with chromium, tantalum and carbon additions thereto. The basic composition may also contain one or more of aluminum, yttrium or the rare earth metals, silicon, manganese, or a dispersion of a metal oxide, such as alumina ($Al_2O_3$).

17 Claims, No Drawings

HIGH TEMPERATURE WEAR RESISTANT COATING COMPOSITION

This invention relates to a composition for producing high temperature wear-resistant coatings and more particularly to a cobalt base composition for producing such coatings.

BACKGROUND OF THE INVENTION

A wide variety of coatings are available for the protection of metal alloy substrates from wear or corrosion in many environments. These coatings range from pure metallic coatings to pure ceramic coatings and encompass the cermet type of coatings which have a high volume fraction of a ceramic phase in a metal matrix. One of the most difficult environments in which to provide protection for a metal substrate is one which combines a high temperature oxidizing or sulfidizing attack with wear of a fretting or impact nature. Only a few coatings have been successful in this type of environment and virtually none when the temperature exceeds about 1800° F. In the relatively low temperature range, i.e., up to 1000° or 1200° F., cermet coatings of tungsten carbide with a cobalt binder are commonly and very successfully used. Above this temperature, however, this type of coating is too rapidly oxidized to be useful for any extended period of time. Cermets as a general class also suffer from a lack of fatigue and impact resistance. It should also be noted tungsten carbide, in addition to being highly susceptible to oxidation, when it is exposed to hot corrosion (an accelerated sulfidation attack due to the presence of sodium sulphate or similar salts), forms a sodium tungstate which leads to a very aggressive catastrophic corrosion. In the intermediate temperature range, a coating consisting of chromium carbide in a nickel-chromium metal matrix has been used with moderate success for many years at temperatures up to about 1800° F. where the wear requirements were not too severe. An example of the use of this coating is on gas turbine blade Z-notches for the older design of engines. To address the ever growing requirements for corrosion resistance and superior wear resistance of more advanced engines, a new class of coatings consisting of a dispersion of hard particles such as oxides, in relatively low volume fraction, in nickel, iron or cobalt base alloys was recently developed and is described more fully in the U.S. Pat. No. 3,864,093. For even more severe wear in corrosive environments, particularly at even higher temperature, however, this class of alloys is generally not strong enough and the matrix tends to creep under either compressive or tensile stresses.

The present invention overcomes the drawbacks associated with the coatings referred above by being directed to a composition for producing a coating for a substrate in which a matrix which is highly resistant to corrosion is strengthened by the formation of a very stable carbide or carbides, and may or may not include a dispersion of oxide particles for additional wear resistance.

SUMMARY OF THE INVENTION

This invention is directed to a coating composition, corrosion and wear-resistant coated article and processes for producing such article. The coated article consists of a substrate with a coated layer, said layer being composed of a cobalt-base alloy containing 17 to 35 percent chromium, 5 to 20 percent tantalum, 0 to 2 percent yttrium, 0 to 2.5 percent silicon, 0 to 3.0 percent manganese, 0.5 to 3.5 percent carbon, 0 to 5 or 14 percent aluminum, all in weight percent, and 0 to 50 volume percent of at least one metal oxide.

The metal matrix of this coating is a cobalt-base alloy. Cobalt was chosen because it has good mechanical and thermal property compatibility with most of the superalloys as well as adequate compatibility with iron-base alloys at lower temperatures. For purposes of this disclosure, superalloys shall mean a face centered cubic alloy of iron, nickel or cobalt which contains a substantial amount of chromium, less than 1% carbon and usually less than 0.1% carbon, which may contain a variety of additional alloying element to provide solid solution or precipitation strengthening. Cobalt has been used as a matrix in low volume fractions for the tungsten-carbide-cobalt family of coatings for many years. Cobalt is, of course, the base for many high temperature superalloys and is well known for its superior hot corrosion resistance compared to nickel or iron. The currently known superalloys have very poor wear-resistance at high temperature, however, even when strengthened with various solid solution strengthening elements such as tungsten or tantalum or precipitated phases such as MC, $M_6C$ or $M_{23}C_6$ carbides wherein M is metal such as tungsten, molybdenum, tantalum and chromium.

The chromium addition to this alloy is not only capable of forming carbides and, hence, strengthening the coating by a precipitate formation, but provides hot corrosion and oxidation resistance at elevated temperatures by the formation of $Cr_2O_3$ protective scales and the modification of sodium sulfate and other salts formed in certain hot corrosion environments to such an extent that they become far less aggressive in their attack on protective chromia or alumina types of scales and the underlying substrates. The preferred range of chromium is from 28–32 percent by weight. An allowable range is 17–35 Wt.%. It has been found experimentally that when chromium is present in excess of 35 Wt.% the coatings are too brittle to be useful. It is known that compositions containing less than 17 Wt.% have inadequate corrosion resistance. It has been found that tantalum additions to alloys provide a solid solution strengthening effect at high temperatures and that they are not detrimental to the hot corrosion resistance or oxidation resistance of the alloys as compared with tungsten, which is very susceptible to sulfidation. Moreover, it has been found that tantalum carbide, which is formed by precipitation in the fabrication of this coating, is a very stable carbide at high temperatures and compatible with the matrix. Thus this carbide provides unusually efficient precipitation strengthening without degrading the corrosion resistance of the alloy at very high temperatures. The tantalum carbides present in conventional superalloys are present in a very fine dispersion in low volume fractions. In this invention the tantalum carbides are present as fairly large particles and in higher volume fraction than in conventional superalloys. The purpose of carbides in conventional superalloys is to provide dispersion strengthening for high temperature mechanical strengths. They do not add a significant amount of wear resistance. Tantalum carbides used in this invention are present for added wear resistance and only incidentally may increase the mechanical properties. The preferred range of tantalum is from 9 to 15 Wt.%. An allowable range is 5–20 Wt.%. If the composition contains much more than 20 Wt.% tantalum, the coating will have insufficient impact resistance. While if the coating contains less than about 5 Wt.% tantalum, the coating will have inadequate wear resistance. Carbon is essential to form carbides by reaction with tantalum and some cases, chromium. As described above, the tantalum carbide provides some or all of wear resistance of the coating. In addition, the tantalum carbide and/or the chromium carbide may add to the mechanical strength of the coating. The preferred range is 2.0 to 3.0 Wt.% carbon. The allowable range is 0.5 to 3.5 Wt.%. Amounts less than 0.5 will provide too little wear resistance and amounts greater than 3.5 degrade the corrosion resistance of the coating. The addition of yttrium or other rare earths has been found to be very beneficial in the retention of protective scales in cyclic oxidation of sulfidation at elevated temperatures. This is particularly true when the alloy contains aluminum and the protective scale formed is alumina. The allowable range for yttrium is 0 to 2.0; the preferred range is 0.5 to 1.5 Wt.%. More than 2 Wt.% yttrium will cause embrittlement. If other rare earths are used, they should be in equivalent amounts based on their relative molecular weights. The aluminum additions selected here, if they are used, are in a range which is adequate to form a protective alumina scale but not so high as to form detrimental volume fractions of aluminides. The allowable range is 5 to 14 Wt.%; the preferred range is 7 to 11 Wt.%. Less than 5% may actually cause accelerated oxidation because there is too little aluminum present to form a continuous alumina scale. Aluminum is added when the coating is to be used in those environments in which the service temperature is expected to exceed that at which the chromia scale is sufficiently protective, since chromia becomes unstable at temperatures above 1800° F. and even at lower temperatures may be inferior in long term protection to the alumina scale formed when the coating contains aluminum.

The oxide additions provide additional wear resistance and some dispersion strengthening for those severe wear applications where the base alloy by itself provides only marginally acceptable wear resistance or where the aluminum addition has degraded somewhat the rear resistance of the base alloy. The oxides chosen must, of course, be stable in the matrix and at the temperature of use. Thus they are selected from the group consisting of aluminum oxide, chromium oxide, beryllium oxide, titanium dioxide, silicon dioxide, thorium oxide, zirconium oxide, tantalum oxide, calcium oxide, magnesium oxide, hafnium oxide, yttrium oxide, and the rare earth oxides and compound combinations of the above such as $MgO.Al_2O_3$ and $CoO.Al_2O_3$ or mixed phase oxides of the above such as $MgO.ZrO_2$. Size of the metal oxide particles can vary between about 0.05 microns and about 74 microns, preferably between about 1 micron and 74 microns, and being present in a volume fraction of between 2 percent and 50 percent, preferably beween about 5 percent and 30 percent. Particle sizes below about 0.05 microns are too small to add useful wear resistance while sizes greater than 74 microns may cause excessive wear to the mating surface. Volume fractions less than about 2 percent do not provide sufficient wear resistance, but if the fraction is greater than 50 percent the material has insufficient ductility, impact resistance and resistance to thermal fatigue.

Some of the wide variety of substrate materials that may be used to form the coated articles of this invention include most frequently the superalloys, but may also include steel, stainless steel, other iron-base alloys with low alloying content, chromium and chromium base alloys and the refractory metal and refractory metal base alloys. In designing a specific article, the specific combination of coating composition and substrate must be chosen by those skilled in the art to withstand the intended environment of use and for compatibility in mechanical and thermal properties between the coating and the substrate for that particular environment. Usually the coating will have a thickness between about 0.003 and 0.010 inches but both thinner and thicker coatings may be suitable for specific applications.

The coating may be applied to the substrate by a variety of techniques. The preferred method is by detonation gun or plasma deposition; however, a transferred plasma arc or any other variety of welding technique may be used. The composition of this invention can be used to make a powder metallurgy sintered article which can be attached to a substrate by brazing. Coatings of this composition can also be made by electrophoretic or slurry deposition followed by sintering to the substrate. Those skilled in the art may find additional methods of producing the coatings of the composition described herein. If the coating is applied by a detonation gun or by plasma arc spraying, it may be advantageous in some instances to follow the deposition with a heat treatment to stress relieve the coating/substrate combination, effect a very thin diffusion bonding between the coating and the substrate, or to densify the coating to provide additional corrosion resistance. It should be noted, however, that testing has shown that detonation gun coatings in particular of this composition are highly corrosion resistant as deposited without subsequent densification by sintering.

The principal of the invention will be illustrated by the following examples:

EXAMPLE I

A cobalt base alloy having the composition of 31.7 Cr; 10.3 Ta; 1.0 C; 0.88 Y; 1.78 Mn; 0.97 Si; Bal Co and sized 325 Tyler mesh and finer was prepared by argon atomization to produce an essentially homogeneous metal alloy powder. A coating of this material was deposited on wear-test samples using the detonation gun under the condition outlined in U.S. Pat. Nos. 2,714,563, 2,950,867, and 2,964,420. Various proportions of acetylene and oxygen were used to produce coatings of different carbon levels. The microstructure of the coatings is essentially lamellar and composed of interlocking and overlapping microscopic leaves mechanically bonded to each other. Depending on the carbon level, the strengthening elements chromium and tantalum were either retained as solid solution strengthener or were precipitated as a carbide and hence visible in the microstructure.

The Vicker hardness number (VHN) of all of these coatings determined in accordance with ASTM Test method E92-67 using a 300 gram test load was greater than 700 kilograms/$mm^2$. The coatings were deposited on Hastelloy-X substrate material for the purpose of testing.

The wear test consisted of a mating pin (0.250 inch in diameter and 0.870 inch long) coated on one end to a thickness of 0.010 inch. The mating pad (1 inch in diameter and 0.870 inch long) is also coated with 0.010 inch thick coating. The two coated surfaces were pressed against each other with a force sufficient to generate a nominal stress of 500 pounds per square inch. The coated pad was held stationary while the coated pin was mechanically driven in an oscillatory translational mode at a frequency of 775 cycles/min. The pin and pad were heated with a high velocity oxygen/propane torch and the temperature was maintained with the aid of carefully positioned thermocouples at a preselected level, normally 1500° F., 1800° F., or 2000° F. Thermal cycling from this preselected temperature to a much lower temperature (usually near 500° F.) was accomplished by moving the torch away from the specimens and allowing rapid forced convection cooling by the introduction of two air jets on either side of the sample. The test consists of 200 of these thermal cycles in the 4.5 hour test duration. The samples were then removed from the test apparatus and measured to determine depth of water and hence volume of material removed.

The test results for these coatings are shown in Table I and compared with uncoated superalloy Hastelloy-X, and a common hard-facing alloy CM-64, weld deposited on Hastelloy-X and a D-gun coating described in U.S. Pat. No. 3,864,093 known as L-102 (28 Cr., 19.5 Tungsten, 5. Nickel, 3. Iron, 1.0 Vanadium, 1.0 Silicon, 1.0 Manganese, 0.85 Carbon bal. Cobalt all in Wt.% plus 3.0 Vol.% $Cr_2O_3$).

CM-64 is nominally — 28.0 Wt.% chromium, 19.5 Wt.% tungsten; 5.0 Wt.% nickel; 3.0 Wt.% iron; 1.0 Wt.% vandium; 1.0 Wt.% silicon; 1.0 Wt.% manganese; 0.85 Wt.% Carbon; bal. cobalt.

Hastelloy-X is nominally — 22.0 Wt.% chromium; 9.0 Wt.% molybdenum; 18.5 Wt.% iron; 1.5 Wt.% cobalt; 0.6 Wt. % tungsten; 1.0 Wt.% silicon; 1.0 Wt.% manganese; 0.10 Wt.% Carbon bal. nickel

TABLE I

| Sample | Material | Depth of Wear |
|---|---|---|
| 1 | Hastelloy-X | Greater than $30 \times 10^{-3}$ inch |
| 2 | CM-64 | Greater than $10 \times 10^{-3}$ inch |
| 3 | L-102 | $2 \times 10^{-3}$ inch |
| 4 | 31.7 Cr; 10.3 Ta; 1.0 C; .88 Y; 1.78 Mn; .97 Si Bal. Co | $3 \times 10^{-3}$ inch |
| 5 | 31.7 Cr; 10.3 Ta; 2.0 C; .88 Y; 1.78 Mn; .97 Si Bal Co | $2 \times 10^{-3}$ inch |
| 6 | 31.7 Cr; 10.3 Ta; 3.0 C; .88 Y; 1.78 Mn; .97 Si Bal Co | $2 \times 10^{-3}$ inch |

All the above data was accumulated at 2000° F. Similar results were obtained when the test tempertures were 1500° F. or 1800° F. for 4½ hours.

EXAMPLE II

A cobalt base alloy having the composition of 31.7 Cr; 10.3 Ta; 1.0 C; 0.88 Y; 1.78 Mn; 0.97 Si Bal Co was mechanically blended with 325 mesh and smaller aluminum oxide to produce a weight fraction of metallic binder of 90% and oxide weight fraction of 10% (a volume fraction of about 30%) and then deposited on the wear pins and pads as described above using the detonation gun process. Wear testing was conducted as described above and the results are shown in Table II.

TABLE II

| Sample | Material | Depth of Wear |
|---|---|---|
| 1 | Hastelloy-X | Greater than $30 \times 10^{-3}$ inch |
| 2 | CM-64 | Greater than $10 \times 10^{-3}$ inch |
| 3 | L-102 | $2 \times 10^{-3}$ inch |
| 4 | (31.7 Cr; 10.3 Ta; 1.0 C; .88 Y; 1.78 Mn; .97 Si Bal Co) + 10 Wt.% (30 Vol.%) $Al_2O_3$ | $2 \times 10^{-3}$ inch |
| 5 | (31.7 Cr; 10.3 Ta; 2.0 C; .88 Y; 1.78 Mn; .97 Si Bal Co) + 10 Wt.% (30 Vol.%) $Al_2O_3$ | $1.5 \times 10^{-3}$ inch |
| 6 | (31.7 Cr; 10.3 Ta; 3.0 C; .88 Y; 1.78 Mn; .97 Si; Bal Co) + 10 Wt.% (30 Vol.%) $Al_2O_3$ | Less than $1 \times 10^{-3}$ inch |

All the above data was accumulated at 2000° F. Similar results were obtained when the test temperatures were 1500° F. or 1800° F. for 4½ hours.

The microstructure of the deposited coating consists of discrete metal oxide particles dispersed substantially uniformly in the metal alloy matrix in a size and quantity as disclosed in U.S. Pat. No. 3,864,093.

EXAMPLE III

Cobalt base alloys having the compositions as shown in Table III were tested in the same manner as the materials shown in Table I. The results were as shown in Table III.

TABLE III

| Sample | Material | Depth of Wear |
|---|---|---|
| 1 | 25.9 Cr; 14.2 Ta; 7.74 Al; 0.5 Y; 0.8 Si; 1.0 C Bal Co | $7 \times 10^{-3}$ inch |
| 2 | 25.3 Cr; 8.6 Ta; 11.1 Al; 1.1 Y; 0.78 Si; 1.79 Mn; 3.0 C Bal Co | $7 \times 10^{-3}$ inch |
| 3 | 37.7 Cr; 11.05 Ta; 7.51 Al; 0.7 Y; .93 Si; 3.0 C Bal Co | Greater than $12 \times 10^{-3}$ inch |
| 4 | 25.2 Cr; 11.0 Ta; 7.56 Al; .86 Y .96 Si; 1.0 C Bal Co | $10 \times 10^{-3}$ inch |
| 5 | 25.9 Cr; 14.2 Ta; 7.74 Al; 0.5 Y; 0.8 Si; 3.0 C Bal Co | $5 \times 10^{-3}$ inch |
| 6 | 25.2 Cr; 11.0 Ta; 7.56 Al; .86 Y .96 Si; 3.0 Bal Co | $7 \times 10^{-3}$ inch |

As can be seen from the above data a composition containing 37.7 chromium resulted in excessive wear beyond that acceptable for the purposes of this invention. Wear of the other materials was greater than that achieved by the materials of the invention shown in Tables I and II as a result of the aluminum addition, but nonetheless useful, while achieving greater oxidation resistance as shown hereinafter in Table V.

EXAMPLE IV

Cobalt base alloys having the compositions shown in Table IV were tested in the same manner as the materials shown in Table I. The results were as shown in Table IV.

TABLE IV

| Sample | Material | Depth of Wear |
|---|---|---|
| 1 | (25.9 Cr; 14.2 Ta; 7.74 Al; 0.5 Y; 0.8 Si; 1.0 C; Bal Co)+ 10 Wt.% (30 Vol. %) $Al_2O_3$. | $3.5 \times 10^{-3}$ inch |
| 2 | (25.9 Cr; 14.2 Ta; 7.74 Al; 0.5 Y; 0.8 Si; 2.0 C; Bal Co)+ 10 Wt. % (30 Vol.%) $Al_2O_3$. | $4.0 \times 10^{-3}$ inch |
| 3 | (25.9 Cr; 14.2 Ta; 7.74 Al; $3 \times 10^{-3}$ inch |

TABLE IV-continued

| Sample | Material | Depth of Wear |
|---|---|---|
| | 0.5 y; 0.8 Si: 3.0 C; Bal Co)+ 10 Wt.% (30 Vol. %) $Al_2O_3$. | |

As can be seen by comparing the above data with that of Tables I, II and III, the addition of $Al_2O_3$ to coatings of this invention containing aluminum improves the wear resistance so that it is comparable to those compositions without aluminum. The $Al_2O_3$ addition makes wear resistance of the coatings less sensitive to carbon content. The data obtained in Table IV was obtained at 2000° F. for 4½ hours test duration. Similar results were obtained at 1500° F. and 1800° F.

EXAMPLE V

An oxidation test of the materials shown in Table V was run by exposing the materials to air at 1000° C. for four cycles of about 25 hours each. (Samples were removed at 25 hours cooled to room temperature and then reheated to 1000° C.) All of the coatings were applied to Hastelloy-X substrate and had a thickness of 10 mils. (0.01 inches).

TABLE V

| Sample | Material | Oxide Scale Thickness and Type |
|---|---|---|
| 1 | Uncoated Hastelloy-X | Catastrophic - Mixed Oxides |
| 2 | Same as L-102 in Table I except Carbon is 3.0% | Greater than .004 inches Mixed Oxides |
| 3 | 31.7 Cr; 10.3 Ta; 1.0 C; .88 Y; 1.78 Mn; 97 Si Bal Co | Less than .0005 inches $Cr_2O_3$ |
| 4 | 31.7 Cr; 10.3 Ta; 3.0 C; .88 Y; 1.78 Mn; 97 Si Bal Co | Less than .0005 inches $Cr_2O_3$ |
| 5 | Same as 3 with 10 Wt. % (30 Vol.%) $Al_2O_3$ | Less than .0005 inches $Cr_2O_3$ |
| 6 | Same as 4 with 10 Wt. % (30 Vol. %) $Al_2O_3$ | Less than .0005 inches $Cr_2O_3$ |
| 7 | 25.9 Cr; 14.2 Ta; 7.74 Al; 0.5 Al; 0.8 Si; 1.0 C Bal Co | Less than .0005 inches $Al_2O_3$ |
| 8 | Same as 7 Except 3.0% C | Less than .0005 inches $Al_2O_3$ |
| 9 | Same as 7 Except 10 Wt. % (30 Vol. %) $Al_2O_3$ | Less than .0005 inches $Al_2O_3$ |
| 10 | Same as 8 Except 10 Wt. % (30 Vol. %) $Al_2O_3$ | Less than .0005 inches $Al_2O_3$ |

As is obvious from the above data, coatings of this invention have far greater oxidation resistance than uncoated superalloys or many prior art coatings. Further, even though the coatings designated at L-102 in Tables I and II show the same or comparable wear resistance to that of the coatings of this invention, it is clear from Table V that in long-term oxidation the coatings of the invention are far superior.

It should also be noted that coatings of invention containing aluminum formed a continuous $Al_2O_3$ layer, while those without aluminum form a continuous $Cr_2O_3$ scale. It is well known that $Al_2O_3$ provides much better long-term oxidation resistance than $Cr_2O_3$. Therefore, coating containing an $Al_2O_3$ layer will provide better long-term high temperature protection in a corrosive environment.

Coatings of the composition of this invention have been made by the plasma deposition process which resulted in excellent coating microstructure and hardness for plasma deposited materials. For example, a deposited coating with a composition of 25.0 Wt.% Cr; 7.0 Wt.% Al; 0.75 Wt.% Y; 10.0 Wt.% Ta; 0.7 Wt.% C; 0.7 Si; Bal Co mixed with 7 Wt.% $Al_2O_3$ had a hardness of 614 kilograms/mm² VH N.

While the invention has been described with reference to certain preferred embodiments it should be understood that certain modifications may be made without departing from the spirit and scope of the invention.

What is claimed is:

1. A coating composition for producing high temperature wear-resistance coating consisting essentially of 17-35 Wt.% chromium; 5-20 Wt.% tantalum; 0.5 to 3.5 carbon, balance Co.

2. Composition according to claim 1 including up to 2.0 Wt.% yttrium or the gram molecular equivalency of the rare earth metals; up to 2.5 Wt.% silicon, up to 3.0 Wt.% manganese.

3. Composition according to claim 1 including 5-14 Wt.% aluminum.

4. Composition according to claim 2 including 5-14 Wt.% aluminum.

5. Composition according to claim 1 including 2-50 Vol. % of a metal oxide taken from the class consisting of aluminum oxide, chromium oxide, beryllium oxide, titanium dioxide, silicon dioxide, thorium oxide, zirconium oxide, tantalum oxide, calcium oxide, magnesium oxide, hafnium oxide, yttrium oxide, and the rare earth oxides and compound combinations or mixed phase oxides of the above.

6. Composition according to claim 2 including 2-50 Vol. % of a metal oxide taken from the class consisting of aluminum oxide, chromium oxide, beryllium oxide, titanium dioxide, silicon dioxide, thorium oxide, zirconium oxide, tantalum oxide, calcium oxide, magnesium oxide, hafnium oxide, yttrium oxide, and the rare earth oxides and compound combinations or mixed phase oxides of the above.

7. Composition according to claim 3 including 2-50 Vol. % of metal oxide taken from the class consisting of aluminum oxide, chromium oxide, beryllium oxide, titanium dioxide, silicon dioxide, thorium oxide, zirconium oxide, tantalum oxide, calcium oxide, magnesium oxide, hafnium oxide, yttrium oxide, and the rare earth oxides and compound combinations or mixed phase oxides of the above.

8. Composition according to claim 4 including 2-50 Vol.% of a metal oxide taken from the class consisting of aluminum oxide, chromium oxide, beryllium oxide, titanium dioxide, silicon dioxide, thorium oxide, zirconium oxide, tantalum oxide, calcium oxide, magnesium oxide, hafnium oxide, yttrium oxide, and the rare earth oxides and compound combinations or mixed phase oxides of the above.

9. A coated article consisting of a metal substrate having a coating layer consisting essentially of 17-35 Wt.% chromium; 5-20 Wt.% tantalum; 0.5 to 3.5 carbon, balance Co.

10. Article according to claim 9 wherein the coating includes up to 2.0 Wt.% yttrium or the gram molecular equivalency of rare earth metals; up to 2.5 Wt.% silicon, up to 3.0 Wt.% manganese.

11. Article according to claim 9 wherein the coating includes 5-14 Wt.% aluminum.

12. Article according to claim 10 wherein the coating includes 5-14 Wt.% aluminum.

13. Article according to claim 9 wherein the coating includes 2-50 Vol.% of a metal oxide taken from the class consisting of aluminum oxide, chromium oxide, beryllium oxide, titanium dioxide, silicon dioxide, thorium oxide, zirconium oxide, tantalum oxide, calcium oxide, magnesium oxide, hafnium oxide, yttrium oxide, and the rare earth oxides and compound combinations or mixed phase oxides of the above.

14. Article according to claim 10 wherein the coating includes 2-50 Vol.% of a metal oxide taken from the class consisting of aluminum oxide, chromium oxide, beryllium oxide, titanium dioxide, silicon dioxide, thorium oxide, zirconium oxide, tantalum oxide, calcium oxide, magnesium oxide, hafnium oxide, yttrium oxide, and the rare earth oxides and compound combinations or mixed phase oxides of the above.

15. Article according to claim 11 wherein the coating includes 2-50 Vol.% of a metal oxide taken from the class consisting of aluminum oxide, chromium oxide, beryllium oxide, titanium dioxide, silicon dioxide, thorium oxide, zirconium oxide, tantalum oxide, calcium oxide, magnesium oxide, hafnium oxide, yttrium oxide, and the rare earth oxides and compound combinations or mixed phase oxides of the above.

16. Article according to claim 12 wherein the coating includes 2-50 Vol.% of a metal oxide taken from the class consisting of aluminum oxide, chromium oxide, beryllium oxide, titanium dioxide, silicon dioxide, thorium oxide, zirconium oxide, tantalum oxide, calcium oxide, magnesium oxide, hafnium oxide, yttrium oxide, and the rare earth oxides and compound combinations or mixed phase oxides of the above.

17. A coated article according to claim 9 wherein the coating layer has a thickness of between 0.003 and 0.010 inches.

* * * * *